US012285939B2

(12) United States Patent
Nishimura

(10) Patent No.: US 12,285,939 B2
(45) Date of Patent: Apr. 29, 2025

(54) IMAGE FORMING APPARATUS

(71) Applicant: SHARP KABUSHIKI KAISHA, Sakai (JP)

(72) Inventor: Michiaki Nishimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 122 days.

(21) Appl. No.: 18/092,860

(22) Filed: Jan. 3, 2023

(65) Prior Publication Data

US 2023/0219351 A1 Jul. 13, 2023

(30) Foreign Application Priority Data

Jan. 7, 2022 (JP) ................................ 2022-001722

(51) Int. Cl.
*B41J 11/00* (2006.01)
*B41J 29/393* (2006.01)

(52) U.S. Cl.
CPC ........... *B41J 11/006* (2013.01); *B41J 29/393* (2013.01)

(58) Field of Classification Search
CPC ...... B41J 11/006; B41J 11/0095; B41J 29/38; B41J 29/393; B41J 29/00; B41J 11/009; G03G 15/70; G03G 15/5012; G03G 2215/00548
See application file for complete search history.

(56) References Cited

U.S. PATENT DOCUMENTS

2012/0075377 A1* 3/2012 Kyotani ............... B41J 11/0095 347/16
2017/0227912 A1* 8/2017 Iino ........................ G03G 15/70

FOREIGN PATENT DOCUMENTS

JP H10107940 A 4/1998
WO 2020/162081 A1 8/2020

* cited by examiner

*Primary Examiner* — Jannelle M Lebron
(74) *Attorney, Agent, or Firm* — ScienBiziP, P.C.

(57) ABSTRACT

An image forming apparatus includes: an operation acceptor; a transporter transporting paper along a transport path; an image former forming an image on the paper on the basis of image data; a paper detector detecting a transport status of the paper on the basis of detection results of paper detection sensors provided at various locations on the transport path; a display; a storage storing a predetermined image showing an assumed jam status of the paper and predetermined guidance for clearing the jam status of the paper when a jam occurs while the paper is transported; and a controller. When the jam occurs while the paper is transported, the controller displays, in a user-selectable manner, a predetermined image showing the paper jam status according to the detection result of the paper detector. When the operation acceptor accepts a selection operation, the controller displays the guidance for clearing the paper jam status.

5 Claims, 16 Drawing Sheets

FIG. 5

| PAPER TRANSPORT STATUS | ASSUMED PAPER JAM STATUS |
|---|---|
| STUCK IN FUSER | ONE SHEET IN FUSER |
| HAS NOT REACHED FUSER | ONE SHEET IN SECONDARY TRANSFERER |
| STUCK IN PS ROLLER | ONE SHEET IN SECONDARY TRANSFERER |
| HAS NOT REACHED PS ROLLER | ONE SHEET IN PAPER FEEDER |
| STUCK IN PAPER FEED ROLLER | ONE SHEET IN PAPER FEEDER |
| HAS NOT REACHED PAPER FEED ROLLER | ONE SHEET IN PAPER FEEDER |

FIG. 8

| PAPER TRANSPORT STATUS | JAM OCCURRENCE TIMING | ASSUMED PAPER JAM STATUS |
|---|---|---|
| STUCK IN FUSER | FIRST SHEET TO MIDDLE OF JOB | ONE SHEET IN FUSER<br>ONE SHEET IN PAPER FEEDER |
| | LAST SHEET | ONE SHEET IN FUSER |
| HAS NOT REACHED FUSER | FIRST SHEET TO MIDDLE OF JOB | ONE SHEET IN SECONDARY TRANSFERER<br>ONE SHEET IN PAPER FEEDER |
| | LAST SHEET | ONE SHEET IN SECONDARY TRANSFERER |
| STUCK IN PS ROLLER | FIRST SHEET | ONE SHEET IN SECONDARY TRANSFERER<br>ONE SHEET IN PAPER FEEDER |
| | SECOND SHEET TO MIDDLE OF JOB | ONE SHEET IN FUSER<br>ONE SHEET IN SECONDARY TRANSFERER<br>ONE SHEET IN PAPER FEEDER |
| | LAST SHEET | ONE SHEET IN FUSER<br>ONE SHEET IN SECONDARY TRANSFERER |
| HAS NOT REACHED PS ROLLER | FIRST SHEET | ONE SHEET IN PAPER FEEDER |
| | MIDDLE OF JOB TO LAST SHEET | ONE SHEET IN FUSER<br>ONE SHEET IN PAPER FEEDER |
| STUCK IN PAPER FEED ROLLER | FIRST SHEET | ONE SHEET IN PAPER FEEDER |
| | MIDDLE OF JOB TO LAST SHEET | ONE SHEET IN FUSER<br>ONE SHEET IN PAPER FEEDER |
| HAS NOT REACHED PAPER FEED ROLLER | FIRST SHEET | ONE SHEET IN PAPER FEEDER |
| | MIDDLE OF JOB TO LAST SHEET | ONE SHEET IN FUSER<br>ONE SHEET IN PAPER FEEDER |

FIG. 11

| PAPER TRANSPORT STATUS | JAM OCCURRENCE TIMING | ASSUMED PAPER JAM STATUS | |
|---|---|---|---|
| | | SMALL SIZE (A4, B5, LT, ETC.) | LARGE SIZE (A3, B4, WLT, ETC.) |
| STUCK IN FUSER | FIRST SHEET TO MIDDLE OF JOB | ONE SHEET IN FUSER<br>ONE SHEET IN PAPER FEEDER | ONE SHEET FROM FUSER TO TRANSFERER |
| | LAST SHEET | ONE SHEET IN FUSER | ONE SHEET IN FUSER |
| HAS NOT REACHED FUSER | FIRST SHEET TO MIDDLE OF JOB | ONE SHEET IN TRANSFERER<br>ONE SHEET IN PAPER FEEDER | ONE SHEET FROM FUSER TO TRANSFERER (DEPENDING ON PAPER FEEDING SOURCE) |
| | LAST SHEET | ONE SHEET IN TRANSFERER | ONE SHEET IN TRANSFERER |
| STUCK IN PS ROLLER | FIRST SHEET | ONE SHEET IN TRANSFERER<br>ONE SHEET IN PAPER FEEDER | ONE SHEET FROM FUSER TO TRANSFERER (DEPENDING ON PAPER FEEDING SOURCE) |
| | SECOND SHEET TO MIDDLE OF JOB | ONE SHEET IN FUSER<br>ONE SHEET IN TRANSFERER<br>ONE SHEET IN PAPER FEEDER | ONE SHEET FROM FUSER TO TRANSFERER (DEPENDING ON PAPER FEEDING SOURCE) |
| | LAST SHEET | ONE SHEET IN FUSER<br>ONE SHEET IN TRANSFERER | ONE SHEET IN TRANSFERER |
| HAS NOT REACHED PS ROLLER | FIRST SHEET | ONE SHEET IN PAPER FEEDER | ONE SHEET IN PAPER FEEDER |
| | MIDDLE OF JOB TO LAST SHEET | ONE SHEET IN FUSER<br>ONE SHEET IN PAPER FEEDER | ONE SHEET IN FUSER<br>ONE SHEET IN PAPER FEEDER |
| STUCK IN PAPER FEED ROLLER | FIRST SHEET | ONE SHEET IN PAPER FEEDER | ONE SHEET IN PAPER FEEDER |
| | MIDDLE OF JOB TO LAST SHEET | ONE SHEET IN FUSER<br>ONE SHEET IN PAPER FEEDER | ONE SHEET IN FUSER<br>ONE SHEET IN PAPER FEEDER |
| HAS NOT REACHED PAPER FEED ROLLER | FIRST SHEET | ONE SHEET IN PAPER FEEDER | ONE SHEET IN PAPER FEEDER |
| | MIDDLE OF JOB TO LAST SHEET | ONE SHEET IN FUSER<br>ONE SHEET IN PAPER FEEDER | ONE SHEET IN FUSER<br>ONE SHEET IN PAPER FEEDER |

FIG. 14

| PAPER TRANSPORT STATUS | NUMBER OF SHEETS TO BE PRINTED IN JOB | JAM OCCURRENCE TIMING | ASSUMED PAPER JAM STATUS | |
|---|---|---|---|---|
| | | | SMALL SIZE (A4, B5, LT, ETC.) | LARGE SIZE (A3, B4, WLT, ETC.) |
| STUCK IN FUSER | PLURAL SHEETS | FIRST SHEET TO MIDDLE OF JOB | ONE SHEET IN FUSER ONE SHEET IN PAPER FEEDER | ONE SHEET FROM FUSER TO TRANSFERER |
| | | LAST SHEET | ONE SHEET IN FUSER | ONE SHEET IN FUSER |
| | ONE SHEET | FIRST SHEET | ONE SHEET IN FUSER | ONE SHEET IN FUSER |
| HAS NOT REACHED FUSER | PLURAL SHEETS | FIRST SHEET TO MIDDLE OF JOB | ONE SHEET IN TRANSFERER ONE SHEET IN PAPER FEEDER | ONE SHEET FROM FUSER TO TRANSFERER (DEPENDING ON PAPER FEEDING SOURCE) |
| | | LAST SHEET | ONE SHEET IN TRANSFERER | ONE SHEET IN TRANSFERER |
| | ONE SHEET | FIRST SHEET | ONE SHEET IN TRANSFERER | ONE SHEET IN TRANSFERER |
| STUCK IN PS ROLLER | PLURAL SHEETS | FIRST SHEET | ONE SHEET IN TRANSFERER ONE SHEET IN PAPER FEEDER | ONE SHEET FROM FUSER TO TRANSFERER (DEPENDING ON PAPER FEEDING SOURCE) |
| | | SECOND SHEET TO MIDDLE OF JOB | ONE SHEET IN FUSER ONE SHEET IN TRANSFERER ONE SHEET IN PAPER FEEDER | ONE SHEET FROM FUSER TO TRANSFERER (DEPENDING ON PAPER FEEDING SOURCE) |
| | | LAST SHEET | ONE SHEET IN FUSER ONE SHEET IN TRANSFERER | ONE SHEET IN TRANSFERER |
| | ONE SHEET | FIRST SHEET | ONE SHEET IN TRANSFERER | ONE SHEET IN TRANSFERER |
| HAS NOT REACHED PS ROLLER | PLURAL SHEETS | FIRST SHEET | ONE SHEET IN PAPER FEEDER | ONE SHEET IN PAPER FEEDER |
| | | MIDDLE OF JOB TO LAST SHEET | ONE SHEET IN FUSER ONE SHEET IN PAPER FEEDER | ONE SHEET IN FUSER ONE SHEET IN PAPER FEEDER |
| | ONE SHEET | FIRST SHEET | ONE SHEET IN PAPER FEEDER | ONE SHEET IN PAPER FEEDER |
| STUCK IN PAPER FEED ROLLER | PLURAL SHEETS | FIRST SHEET | ONE SHEET IN PAPER FEEDER | ONE SHEET IN PAPER FEEDER |
| | | MIDDLE OF JOB TO LAST SHEET | ONE SHEET IN FUSER ONE SHEET IN PAPER FEEDER | ONE SHEET IN FUSER ONE SHEET IN PAPER FEEDER |
| | ONE SHEET | FIRST SHEET | ONE SHEET IN PAPER FEEDER | ONE SHEET IN PAPER FEEDER |
| HAS NOT REACHED PAPER FEED ROLLER | PLURAL SHEETS | FIRST SHEET | ONE SHEET IN PAPER FEEDER | ONE SHEET IN PAPER FEEDER |
| | | MIDDLE OF JOB TO LAST SHEET | ONE SHEET IN FUSER ONE SHEET IN PAPER FEEDER | ONE SHEET IN FUSER ONE SHEET IN PAPER FEEDER |
| | ONE SHEET | FIRST SHEET | ONE SHEET IN PAPER FEEDER | ONE SHEET IN PAPER FEEDER |

IMAGE FORMING APPARATUS

BACKGROUND OF THE INVENTION

Field of the Invention

The present disclosure relates to an image forming apparatus and more particularly to an image forming apparatus that has a guidance display function for clearing a paper jam.

Description of the Background Art

There is an image forming apparatus such as a multifunction peripheral that has been known to have a function of displaying guidance for clearing a jam such as a paper jam and an error such as running out of toner on an operation panel.

As an invention related to such an image forming apparatus having the guidance display function for clearing the jam, the following display device has conventionally been known. The display device sequentially displays plural jam processing guidance screens, each of which corresponds to a respective jam occurrence location, on a control panel.

The following image forming apparatus has also been known. In the image forming apparatus, a camera acquires an image of a component and a part to be checked that correspond to an occurred error, and the image is subjected to an image analysis using pattern matching with a reference image that is captured when no error occurs. Then, in the case where it is determined that a foreign object (jammed paper) is present, an instruction image pointing the foreign object is displayed on a display as a guidance image showing a work procedure for clearing the error.

In the conventional image forming apparatus having the guidance display function for clearing the jam, the occurrence of the jam is detected by sensors provided at various locations, and the jam processing guidance screens are then sequentially displayed on the basis of on/off of the sensors.

However, in the case where the jam occurs at a location that is undetectable by the sensor, the appropriate guidance cannot be displayed. In addition, there is a problem of increased cost when the installation number of the dedicated sensors and cameras is increased for a purpose of displaying the appropriate guidance.

The present disclosure has been made in view of circumstances as described above and therefore has a purpose of providing an image forming apparatus capable of more efficiently displaying guidance for clearing a paper jam than the related art.

SUMMARY OF THE INVENTION

The present disclosure provides an image forming apparatus including: an operation acceptor that accepts an input operation by a user; a transporter that transports paper along a transport path; an image former that forms an image on the paper on the basis of image data when accepting a print command of the image data from the user; a paper detector that detects a transport status of the paper on the basis of detection results of paper detection sensors that are provided at various locations on the transport path; a display that displays various types of information for the user; a storage that stores a predetermined image showing an assumed jam status of the paper and predetermined guidance for clearing the jam status of the paper when a jam, in which the paper is jammed, occurs while the paper is transported; and a controller that controls the operation acceptor, the transporter, the image former, the paper detector, the display, and the storage. In the case where the jam, in which the paper is jammed, occurs while the paper is transported, the controller causes the display to display, in a user-selectable manner, a predetermined image showing the paper jam status according to the detection result of the paper detector. In the case where the operation acceptor accepts a selection operation of the image, the controller causes the display to display the guidance for clearing the paper jam status, the guidance corresponding to the selected image.

In the present disclosure, the “image forming apparatus” is an apparatus that forms and outputs the image. Examples of the image forming apparatus are a copying machine and a multifunction machine with a reproduction (copy) function, such as a printer using an electrophotographic method for forming the image with toner, and a multifunctional peripheral (MFP) that has other functions in addition to the reproduction function. The image forming apparatus in the present disclosure may be an apparatus that forms the image by using a medium (for example, ink or the like) other than the toner, and an image forming method thereof is not limited as long as the image forming apparatus in the present disclosure has the transporter that transports the paper along the transport path.

According to the present disclosure, in the case where the jam, in which the paper is jammed, occurs while the paper is transported, the display displays, in a user-selectable manner, the predetermined image, which shows a paper jam status, according to the detection result of the paper detector. Therefore, it is possible to provide the digital multifunction peripheral capable of more efficiently displaying the guidance for clearing the paper jam than the related art.

Furthermore, a description will be made on preferred aspects of the present disclosure.

In the image forming apparatus according to the present disclosure, the image showing the paper jam status may be an image showing one of various patterns of the status where the paper is jammed at respective locations on the transport path when a predetermined cover of a body is opened.

In this way, in the case where the jam, in which the paper is jammed, occurs while the paper is transported, the display displays, in a user-selectable manner, the image, which shows one of the various patterns of the status at the respective location on the transport path when the body cover is actually opened, according to the detection result of the paper detector. Therefore, it is possible to provide the digital multifunction peripheral capable of more efficiently displaying the guidance for clearing the paper jam than the related art.

In the image forming apparatus according to the present disclosure, in the case where the controller accepts the print command of the image data from the user and thereafter the jam, in which the paper is jammed, occurs while the paper is transported, the controller may determine whether the number of images to be printed, which is based on the image data, is plural and, when the number of the images to be printed is plural, may identify what number of the image is printed at the time when the jam occurs, so as to identify occurrence timing of the jam, and the controller may cause the display to display, in a user-selectable manner, the predetermined image showing the paper jam status according to the detection result of the paper detector and the jam occurrence timing.

In this way, in the case where the jam, in which the paper is jammed, occurs while the paper is transported, the display displays, in a user-selectable manner, the predetermined image, which shows the paper jam status, according to the detection result of the paper detector and the jam occurrence timing. Therefore, it is possible to provide the digital multifunction peripheral capable of more efficiently displaying the guidance for clearing the paper jam than the related art.

In the image forming apparatus according to the present disclosure, in the case where the controller accepts the print command of the image data from the user and thereafter the jam, in which the paper is jammed, occurs while the paper is transported, the controller may identify a paper size of the image based on the image data, and the controller may cause the display to display, in a user-selectable manner, the predetermined image that shows the paper jam status according to the detection result of the paper detector and the paper size.

In this way, in the case where the jam, in which the paper is jammed, occurs while the paper is transported, the display displays, in a user-selectable manner, the predetermined image, which shows the paper jam status, according to the detection result of the paper detector and the paper size. Therefore, it is possible to provide the digital multifunction peripheral capable of more efficiently displaying the guidance for clearing the paper jam than the related art.

In the image forming apparatus according to the present disclosure, the paper size may include a first paper size and a second paper size that is larger than the first paper size, the first paper size may include paper sizes of A4 and B5, and the second paper size may include paper sizes of A3 and B4.

In this way, in consideration of the paper jam status that is assumed when the paper size is the first paper size (A4 or B5) or the second paper size (A3 or B4), the display displays, in a user-selectable manner, the predetermined image showing the paper jam status according to the detection result of the paper detector and the paper size. Therefore, it is possible to provide the digital multifunction peripheral capable of more efficiently displaying the guidance for clearing the paper jam than the related art.

BRIEF DESCRIPTION OF THE DRAWINGS

FIG. 5 is a table illustrating exemplary relationships between a paper transport status and an assumed paper jam status in the digital multifunction peripheral in FIG. 1.

FIG. 6A illustrates the exemplary message that is provided when the assumed paper jam status is only one sheet in a fuser, and FIG. 6B illustrates the exemplary message that is provided when the assumed paper jam status is one sheet in the fuser and one sheet in a secondary transferer.

FIG. 8 is a table illustrating exemplary relationships between a paper transport status and a paper jam status, which is assumed when the number of sheets to be printed in a job is plural, in the digital multifunction peripheral according to the second embodiment of the present disclosure.

FIG. 11 is a table illustrating exemplary relationships between a paper transport status and a paper jam status, which is assumed when the number of the sheets to be printed in the job is plural and the paper size is each of the small size and the large size, in the digital multifunction peripheral according to the third embodiment of the present disclosure.

FIG. 14 is a table illustrating exemplary relationships between a paper transport status and a paper jam status, which is assumed when the number of sheets to be printed in a job is plural and a paper size is each of a small size and a large size, in the digital multifunction peripheral according to the fourth embodiment of the present disclosure.

DESCRIPTION OF THE PREFERRED EMBODIMENTS

A further detailed description will hereinafter be made on the present disclosure with reference to the drawings. The following description is illustrative in all respects and should not be construed as limiting the present disclosure.

First Embodiment

Configuration of Digital Multifunction Peripheral 1

A description will hereinafter be made on an overview of a digital multifunction peripheral 1 as an example of an image forming apparatus according to a first embodiment of the present disclosure with reference to FIG. 1 to FIG. 3.

Figure 1:
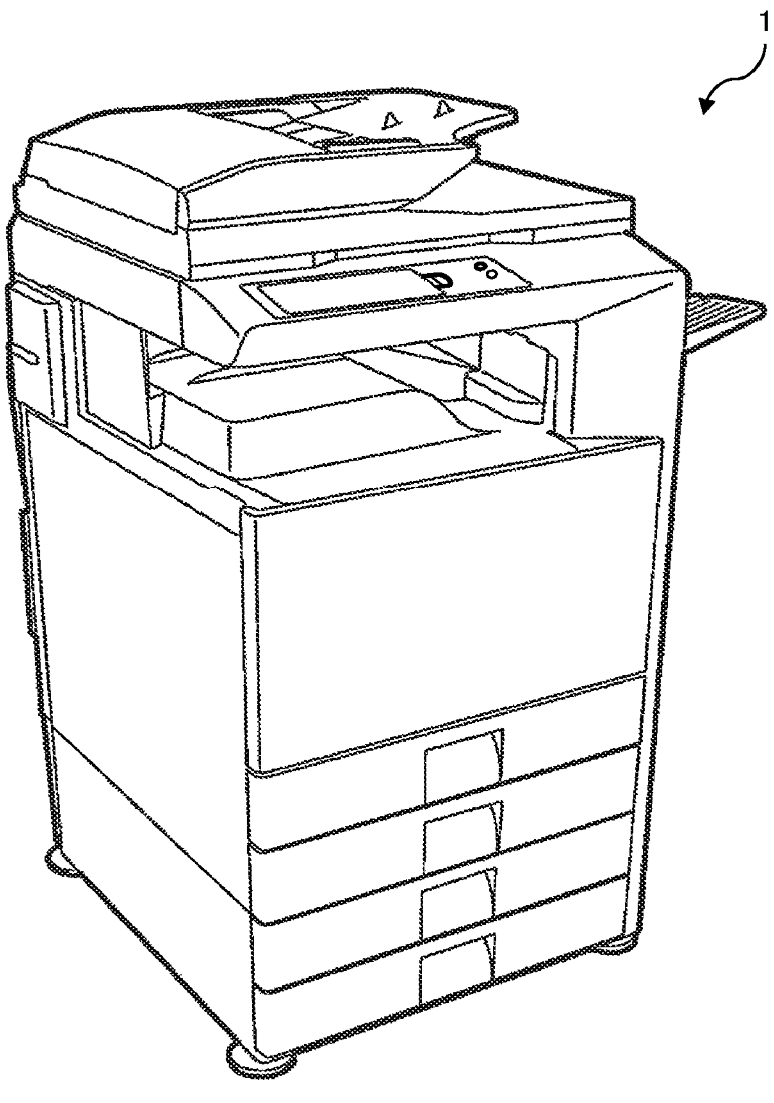
FIG. 1 is a perspective view illustrating external appearance of a digital multifunction peripheral according to a first embodiment of the present disclosure.

FIG. 1 is a perspective view illustrating external appearance of the digital multifunction peripheral 1 according to the first embodiment of the present disclosure.

The digital multifunction peripheral 1 is an apparatus that has a reproduction function, a scanner function, and a facsimile function, digitally processes image data read from a document, and outputs the digitally-processed image data.

The digital multifunction peripheral 1 has, as a print mode, a copy (reproduction) function, a print function, and a FAX function. A controller 100 (FIG. 3) selects a printing function of the digital multifunction peripheral 1 that corresponds to input of an operation from an operation panel 108 (FIG. 3) or reception of a print job from an external device such as a personal computer (PC).

Internal Configuration of Digital Multifunction Peripheral 1

Next, a simple description will be made on an internal configuration of the digital multifunction peripheral 1 with reference to FIG. 2.

Figure 2:
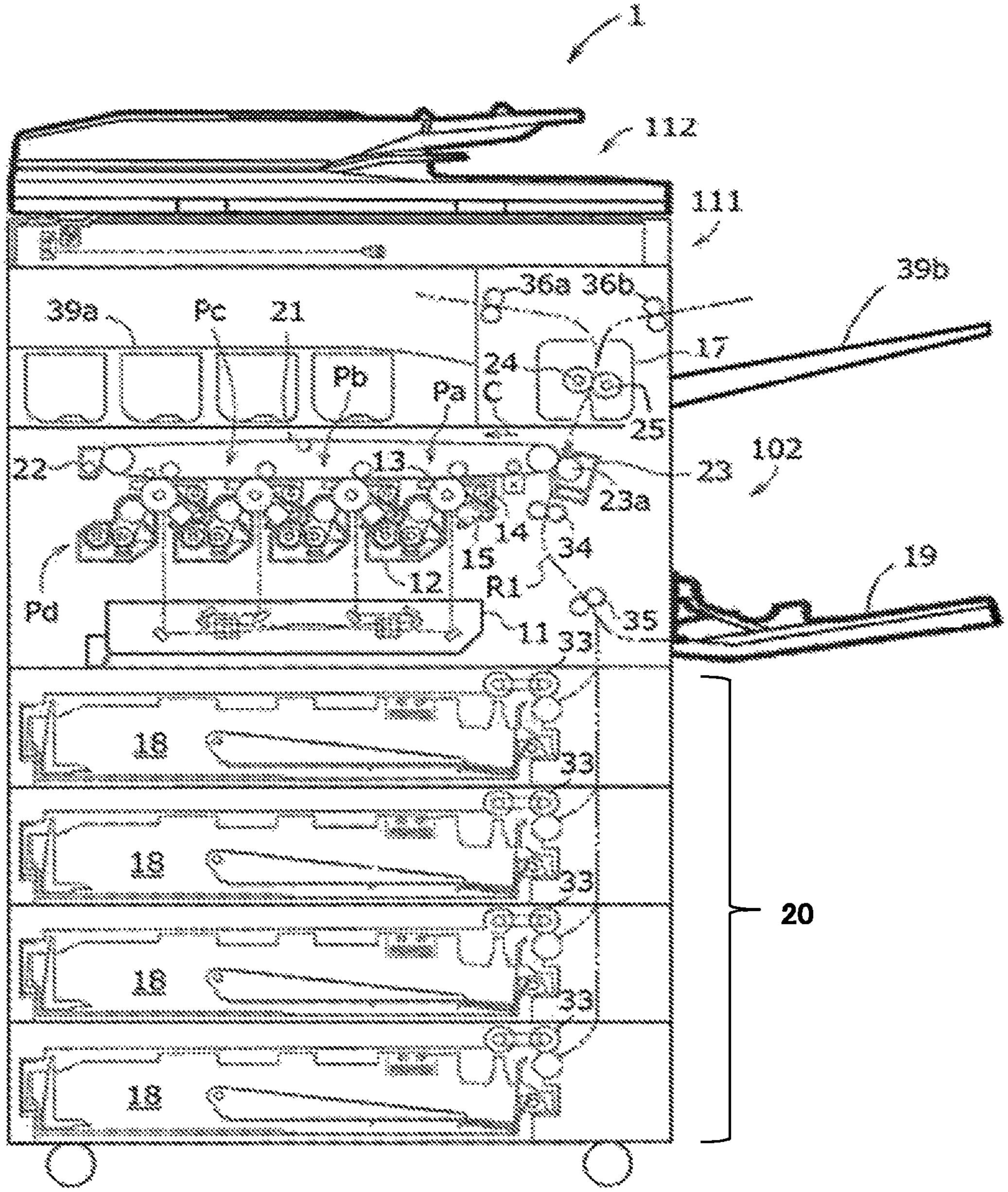
FIG. 2 is a cross-sectional view illustrating an internal configuration of the digital multifunction peripheral in FIG. 1.

FIG. 2 is a cross-sectional view illustrating the internal configuration of the digital multifunction peripheral 1 in FIG. 1.

In the digital multifunction peripheral 1, a color image using black (K), cyan (C), magenta (M), and yellow (Y) colors is printed on printing paper (hereinafter also simply referred to as "paper").

Alternatively, a monochrome image using a single color (for example, black) is printed on the paper.

For this reason, four each of developing devices 12, photoconductor drums 13, drum cleaners 14, chargers 15, and the like are provided.

In order to form four types of toner images corresponding to the respective colors, each group of the developing device 12, the photoreceptor drum 13, the drum cleaner 14, and the charger 15 constitutes one of four image stations Pa, Pb, Pc, Pd in a manner to correspond to respective one of black, cyan, magenta, and yellow.

In any of the image stations Pa, Pb, Pc, Pd, the toner image is formed as follows. The drum cleaner 14 removes and collects residual toner on a surface of the photoconductor drum 13.

Thereafter, the charger 15 uniformly charges the surface of the photoconductor drum 13 to a predetermined potential.

Then, an optical scanner 11 exposes the uniformly-charged surface to form an electrostatic latent image on the surface.

Thereafter, the developing device 12 develops the electrostatic latent image. In this way, the toner image in each of the colors is formed on the surface of the respective photoconductor drum 13.

An intermediate transfer belt 21 moves rotationally in an arrow direction C. A belt cleaner 22 removes and collects residual toner on the rotationally-moving intermediate transfer belt 21.

The toner images in the colors on the surfaces of the respective photoconductor drums 13 are sequentially transferred and superimposed onto the intermediate transfer belt 21. In this way, the color toner image is formed on the intermediate transfer belt 21.

The paper is pulled out of one of four paper feed trays 18 in a paper feeder 20 by a pickup roller 33 and is then fed to a secondary transferer 23 via a paper transport path R1. Alternatively, the paper is fed from a manual feed tray 19 by the pickup roller 33, which is not illustrated, and is then fed to the secondary transferer 23 via the paper transport path R1.

A PS roller 34 that stops the paper once and aligns leading edges of plural sheets of the paper is arranged in the paper transport path R1.

A paper feed roller 35 that facilitates feeding of the paper, and the like are also arranged therein.

After stopping the paper once, the PS roller 34 transports the paper to a nip area between the intermediate transfer belt 21 and a transfer roller 23*a* at timing that matches transfer timing of the toner image.

The nip area is formed between the transfer roller 23*a* of the secondary transferer 23 and the intermediate transfer belt 21.

When the paper passes the nip area, the color toner image that is formed on the surface of the intermediate transfer belt 21 is transferred to the paper.

After passing through the nip area, the paper is sandwiched between a heating roller 24 and a pressure roller 25 in a fuser 17 and is then heated and pressurized.

With such heating and pressurization, the color toner image is fused onto the paper.

The paper that has passed through the fuser 17 is discharged to a discharge tray 39*a* or 39*b* through a discharge roller 36*a* or 36*b*, respectively.

A paper discharge destination is controlled by the controller 100, which will be described below, and the transport path is switched by an unillustrated switching mechanism such that the paper is guided to one of the discharge trays 39*a*, 39*b*.

The switching mechanism that switches the paper transport path is well known in the technical field of the image forming apparatus and thus is not illustrated in detail.

Next, a description will be made on an electrical configuration of the digital multifunction peripheral 1 with reference to FIG. 3.

Figure 3:
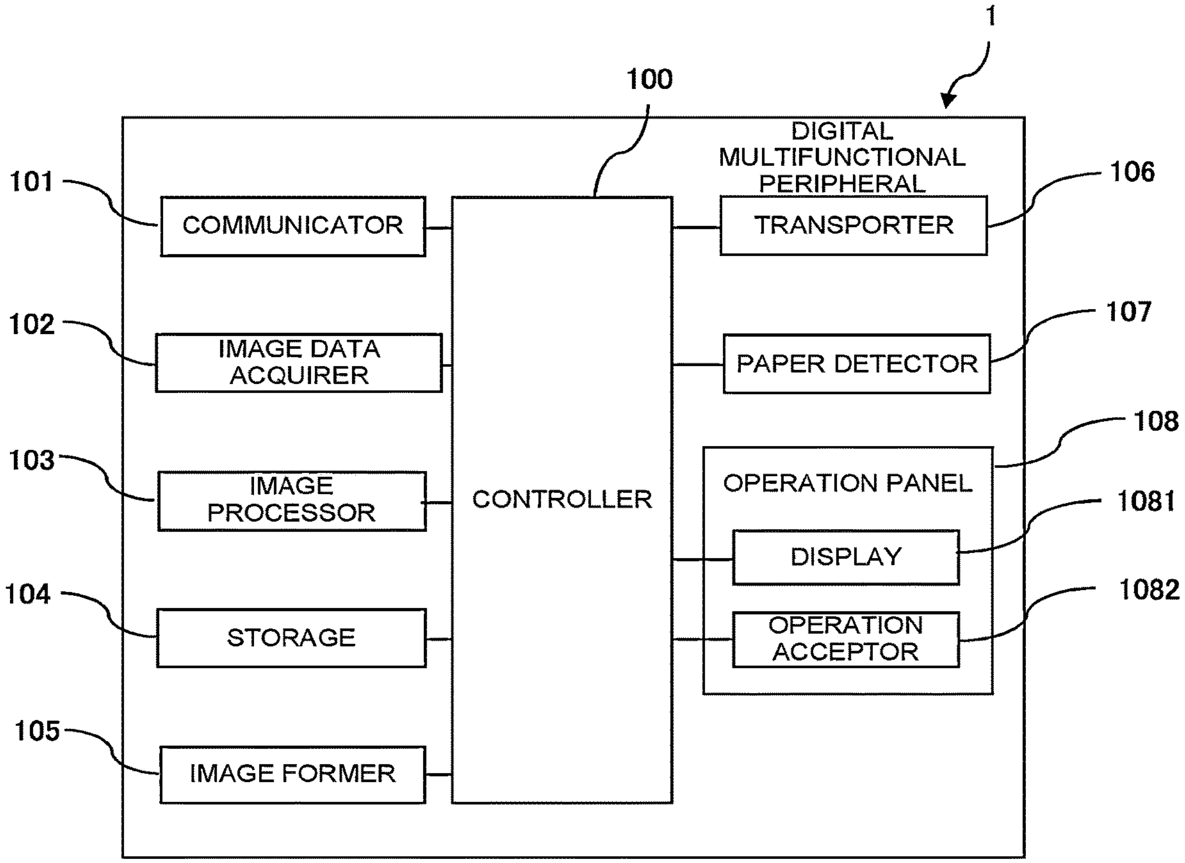
FIG. 3 is a block diagram illustrating an electrical configuration of the digital multifunction peripheral illustrated in FIG. 1.

FIG. 3 is a block diagram illustrating the electrical configuration of the digital multifunction peripheral 1 illustrated in FIG. 1.

As illustrated in FIG. 3, the digital multifunction peripheral 1 includes the controller 100, a communicator 101, an image data acquirer 102, an image processor 103, a storage 104, an image former 105, a transporter 106, a paper detector 107, and the operation panel 108.

A description will hereinafter be made on each component of the digital multifunction peripheral 1.

The controller 100 controls the digital multifunction peripheral 1 comprehensively and is constructed of a CPU, random-access memory (RAM), read-only memory (ROM), various interface circuits, and the like.

In order to control entire operation of the digital multifunction peripheral 1, the controller 100 monitors and controls all types of loads such as detection by each sensor, a motor, a clutch, the operation panel 108, and the like.

The communicator 101 is a component that communicates with, via a wired or wireless network, an external information processor, such as a computer or a portable information terminal, and an external facsimile machine so as to exchange various types of data, such as an e-mail and a fax, with these external devices.

The image data acquirer 102 is a component that detects and reads the document placed on a document table or the document transported from a document tray so as to generate the image data.

The image data acquirer 102 is also a component that acquires the image data generated by the external information processor (not illustrated), the external facsimile machine (not illustrated), and the like.

The image processor 103 is a component that executes processing such as scaling of the image data, which is generated or acquired by the image data acquirer 102, in accordance with a command from an operation acceptor 1082 so as to make the image data suitable for output.

The storage 104 is an element or a storage medium that stores necessary information to implement the various functions of the digital multifunction peripheral 1, a control program, and the like. For example, any of storage mediums including semiconductor elements, such as the ROM and the RAM, a hard disk, flash memory, and an SSD is used as the storage 104.

Here, the program and the data may be held by mutually different devices in such a manner that the hard disk drive constitutes a data holding area while the flash memory constitutes a program holding area.

The image former 105 is a component that prints out the image data, which is generated or acquired by the image data acquirer 102 and is processed by the image processor 103, onto the paper.

The image former 105 is configured to further include electrical components related to the optical scanner 11, the developing device 12, the photoconductor drum 13, the drum cleaner 14, and the charger 15, which are illustrated in FIG. 2.

The image former 105 is further configured to include electrical components related to the intermediate transfer belt 21, the fuser 17, the paper transport path R1, the paper feeder 20, and the discharge trays 39*a,* 39*b.*

The transporter 106 is a component that transports the paper, which is stored in the paper feed tray 18 of the paper feeder 20 and the manual feed tray 19, to the image former 105, and after printing, discharges the paper to the discharge trays 39*a,* 39*b.*

The paper detector 107 is a component that includes plural paper detection sensors provided at predetermined locations on the paper transport path to detect a paper transport status and a paper jam.

The operation panel 108 is a unit that includes a liquid crystal display, and includes a display 1081 and the operation acceptor 1082.

The display 1081 is a component that shows various types of information. The display 1081 is constructed of a CRT display, the LCD, an EL display, or the like, for example, and is a display device such as a monitor or a line display for an operating system or application software to show electronic data such as a processing state.

The controller 100 causes the display 1081 to display the operation and a state of the digital multifunction peripheral 1.

The operation acceptor 1082 is a component that is constructed of physical operation keys such as a touch panel and a power key and accepts a command from a user.

Guidance Display Processing for Clearing Jam upon Occurrence of Paper Jam in Digital Multifunction Peripheral 1

Next, a description will be made on guidance display processing for clearing a jam upon occurrence of the paper jam in the digital multifunction peripheral 1 with reference to FIG. 4 to FIG. 8.

Figure 4:
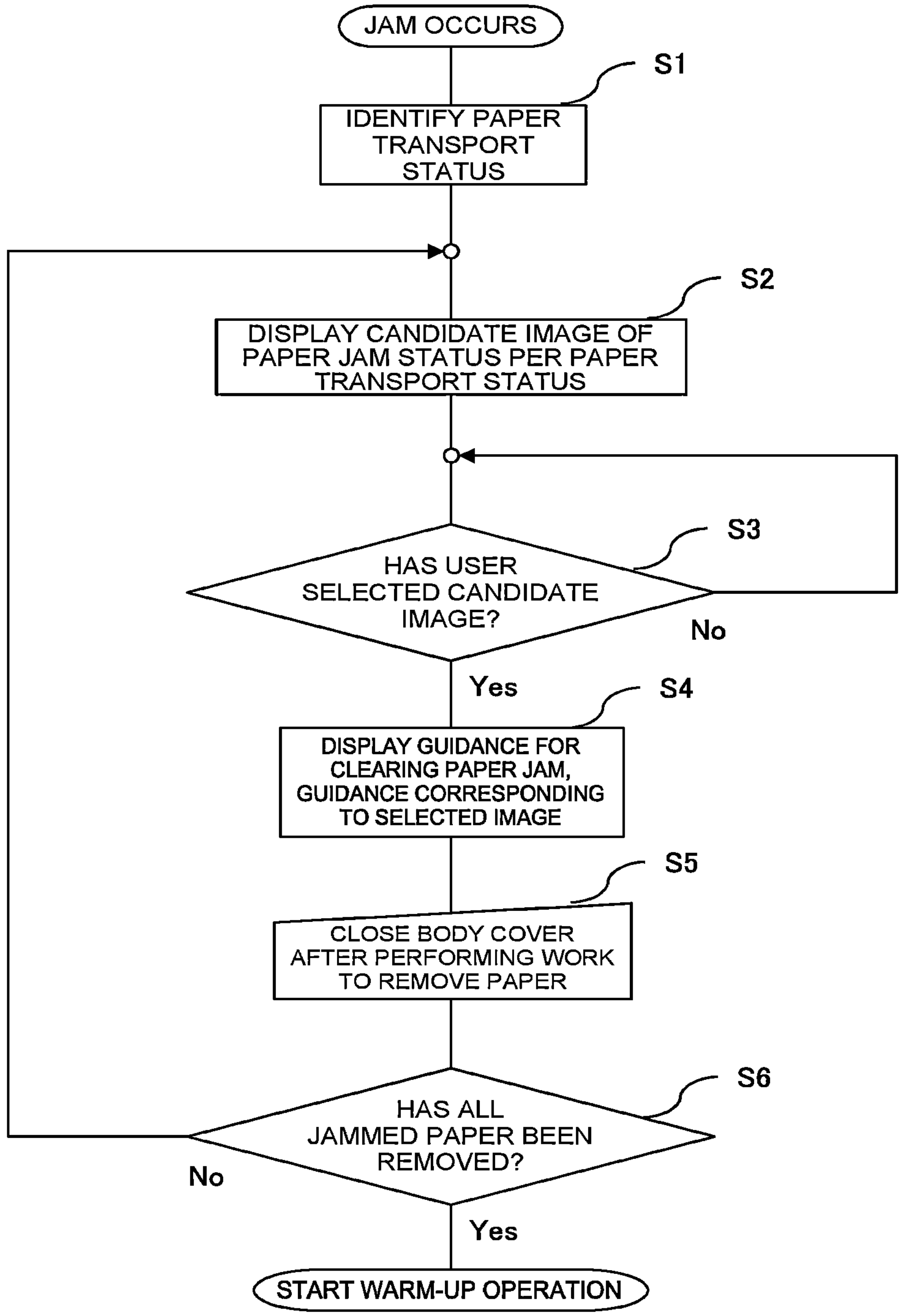
FIG. 4 is a flowchart illustrating an example of guidance display processing for clearing a jam upon occurrence of a paper jam in the digital multifunction peripheral in FIG. 1.

FIG. 4 is a flowchart illustrating an example of the guidance display processing for clearing the jam upon the occurrence of the paper jam in the digital multifunction peripheral 1 in FIG. 1.

In FIG. 4, it is assumed that the jam caused by the paper jam has occurred.

When the jam caused by the paper jam occurs, in step S1, the controller 100 identifies the transport status of the paper that is detected by the paper detector 107 (Step S1).

FIG. 5 is a table illustrating exemplary relationships between the paper transport status and an assumed paper jam status in the digital multifunction peripheral 1 in FIG. 1.

In the first embodiment, in order to detect the paper transport status, the plural paper detection sensors are provided at the various locations on the paper transport path R1.

In the first embodiment, it is assumed that the one paper detection sensor is provided between the pickup roller 33 and the paper feed roller 35, that the one paper detection sensor is provided to the paper feed roller 35, that the one paper detection sensor is provided to the PS roller 34, that the one paper detection sensor is provided between the paper feed roller 35 and the PS roller 34, that the one paper detection sensor is provided to the fuser 17, and that the one paper detection sensor is provided between the PS roller 34 and the fuser 17.

Based on detection results of these paper detection sensors, the controller 100 identifies the paper transport status and the paper jam status, which is assumed from the paper transport status.

In the Case Where Paper is Stuck in Fuser 17

For example, in the case where the paper detector 107 detects the paper in the fuser 17, the controller 100 assumes a state where the paper is stuck in the fuser 17, and thus the assumed paper jam status is one sheet in the fuser 17.

In the Case Where Paper Has Not Reached Fuser 17

In the case where the paper detector 107 detects the paper between the PS roller 34 and the fuser 17, the controller 100 assumes a state where the paper has not reached the fuser 17, and thus the assumed paper jam status is one sheet in the secondary transferer 23.

In the Case Where Paper is Stuck in PS Roller 34

In the case where the paper detector 107 detects the paper in the PS roller 34, the controller 100 assumes a state where the paper is stuck in the PS roller 34, and thus the assumed paper jam status is one sheet in the secondary transferer 23.

In the Case Where Paper Has Not Reached PS Roller 34

In the case where the paper detector 107 detects the paper between the paper feed roller 35 and the PS roller 34, the controller 100 assumes a state where the paper has not reached the PS roller 34, and thus the assumed paper jam status is one sheet in the paper feeder 20.

In the Case Where Paper is Stuck in Paper Feed Roller 35

In the case where the paper detector 107 detects the paper in the paper feed roller 35, the controller 100 assumes a state where the paper is stuck in the paper feed roller 35, and thus the assumed paper jam status is one sheet in the paper feeder 20.

In the Case Where Paper Has Not Reached Paper Feed Roller 35

In the case where the paper detector 107 detects the paper between the pickup roller 33 and the paper feed roller 35, the controller 100 assumes a state where the paper has not reached the paper feed roller 35, and thus the assumed paper jam status is one sheet in the paper feeder 20.

Next, in step S2, the controller 100 causes the display 1081 to display a candidate image of a paper jam status per the paper transport statuses (Step S2).

Figure 6A:
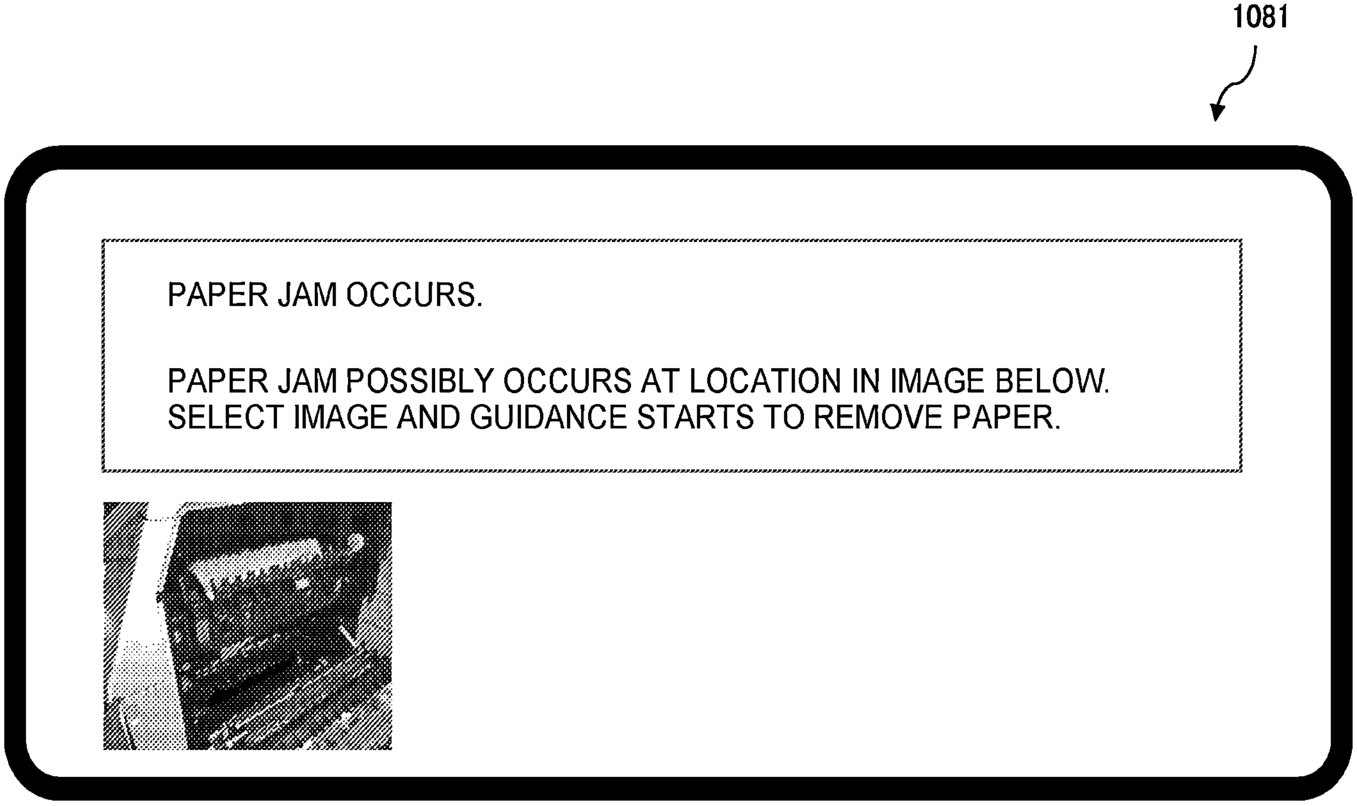
FIG. 6A and FIG. 6B are explanatory views, each of which illustrates an exemplary message that informs occurrence of the paper jam in the digital multifunction peripheral illustrated in FIG. 1.
Figure 6B:
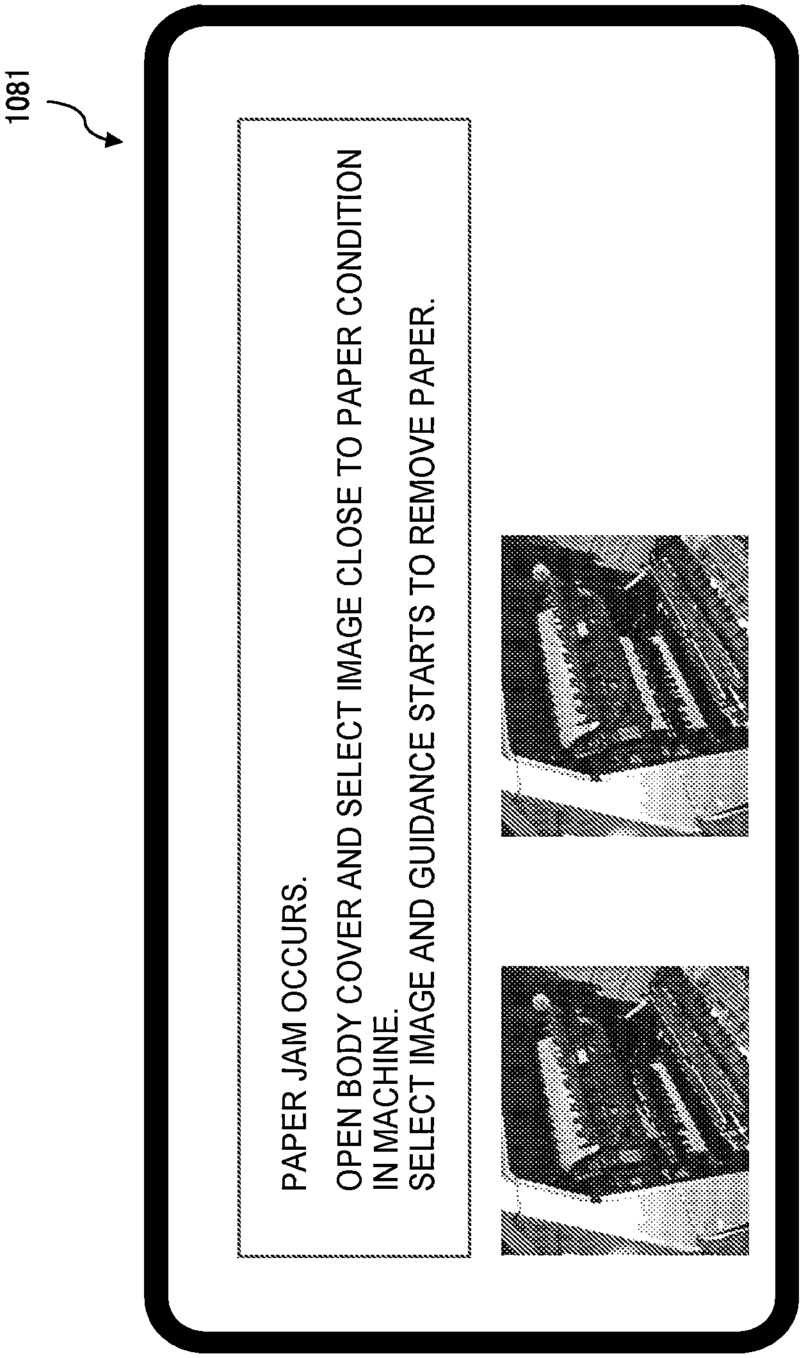

FIG. 6A and FIG. 6B are explanatory views, each of which illustrates an exemplary message that informs occurrence of the paper jam in the digital multifunction peripheral 1 illustrated in FIG. 1.

FIG. 6A illustrates the exemplary message that is provided when the assumed paper jam status is only one sheet in the fuser 17.

In the example illustrated in FIG. 6A, an image showing that the paper jam has occurred in the fuser 17 is displayed with a message "PAPER JAM OCCURS. PAPER JAM POSSIBLY OCCURS AT LOCATION IN IMAGE BELOW. SELECT IMAGE AND GUIDANCE STARTS TO REMOVE PAPER."

When the user selects the image, the controller 100 starts the guidance for removing the paper, the guidance corresponding to the image.

FIG. 6B illustrates the exemplary message that is provided when the assumed paper jam status is one sheet in the fuser 17 and one sheet in the secondary transferer 23.

In the example illustrated in FIG. 6B, images showing that the paper jam has occurred in the fuser 17 and the secondary transferer 23 are displayed with a message "PAPER JAM OCCURS. OPEN BODY COVER AND SELECT IMAGE CLOSE TO PAPER CONDITION IN MACHINE. ONCE SELECT IMAGE, START GUIDANCE TO REMOVE PAPER."

A left image in FIG. 6B shows a case where one each of two sheets of the small-size paper (for example, A4 paper or the like) is jammed in the fuser 17 and the secondary transferer 23.

Meanwhile, a right image in FIG. 6B shows a case where one sheet of the large-size paper (for example, A3 paper or the like) is jammed from the fuser 17 to the secondary transferer 23.

In this case, in order to identify whether the assumed paper jam status is that the two sheets of the small-size paper are jammed or that the one sheet of the large-size paper is jammed, the user opens the body cover to select the image close to the paper condition in the digital multifunction peripheral 1.

When the user selects the image, the controller 100 starts the guidance for removing the paper, the guidance corresponding to the image.

Next, in step S3 illustrated in FIG. 4, the controller 100 determines whether the user has selected the candidate image (Step S3).

If the user has selected the candidate image (if the determination in step S3 is Yes), in step S4, the controller 100 causes the display 1081 to display the guidance for clearing the paper jam, the guidance corresponding to the selected image (step S4).

Next, in step S5, when the user performs work to remove the paper and thereafter closes the body cover (step S5), in following step S6, the controller 100 determines whether all the jammed paper has been removed on the basis of the detection result of the paper detector 107 (step S6).

If all the jammed paper has been removed (if the determination in step S6 is Yes), the controller 100 terminates the guidance display processing for clearing the jam and starts predetermined warm-up operation.

On the other hand, if not all of the jammed paper has been removed (if the determination in step S6 is No), the processing returns to step S2.

In the case where the paper jam occurs at two or more locations, the controller 100 deletes the image corresponding to the location where the paper has been removed, and causes the display 1081 to only display the image corresponding to the location where the paper has not been removed.

In this way, in the case where the paper jam occurs while the paper is transported, the display 1081 displays, in a user-selectable manner, the predetermined image that shows the paper jam status according to the detection result of the paper detector 107. Therefore, it is possible to provide the digital multifunction peripheral 1 capable of more efficiently displaying the guidance for clearing the paper jam than the related art.

Second Embodiment

Guidance Display Processing for Clearing Jam upon Occurrence of Paper Jam in Digital Multifunction Peripheral 1 According to Second Embodiment of the Present Disclosure Next, a description will be made on guidance display processing for clearing the jam upon the occurrence of the paper jam in a digital multifunction peripheral 1 according to a second embodiment of the present disclosure with reference to FIG. 7 to FIG. 9.

Since a configuration of the digital multifunction peripheral 1 in the second embodiment is the same as that of the digital multifunction peripheral 1 in the first embodiment (FIG. 1 to FIG. 3), a description thereon will not be made.

Figure 7:
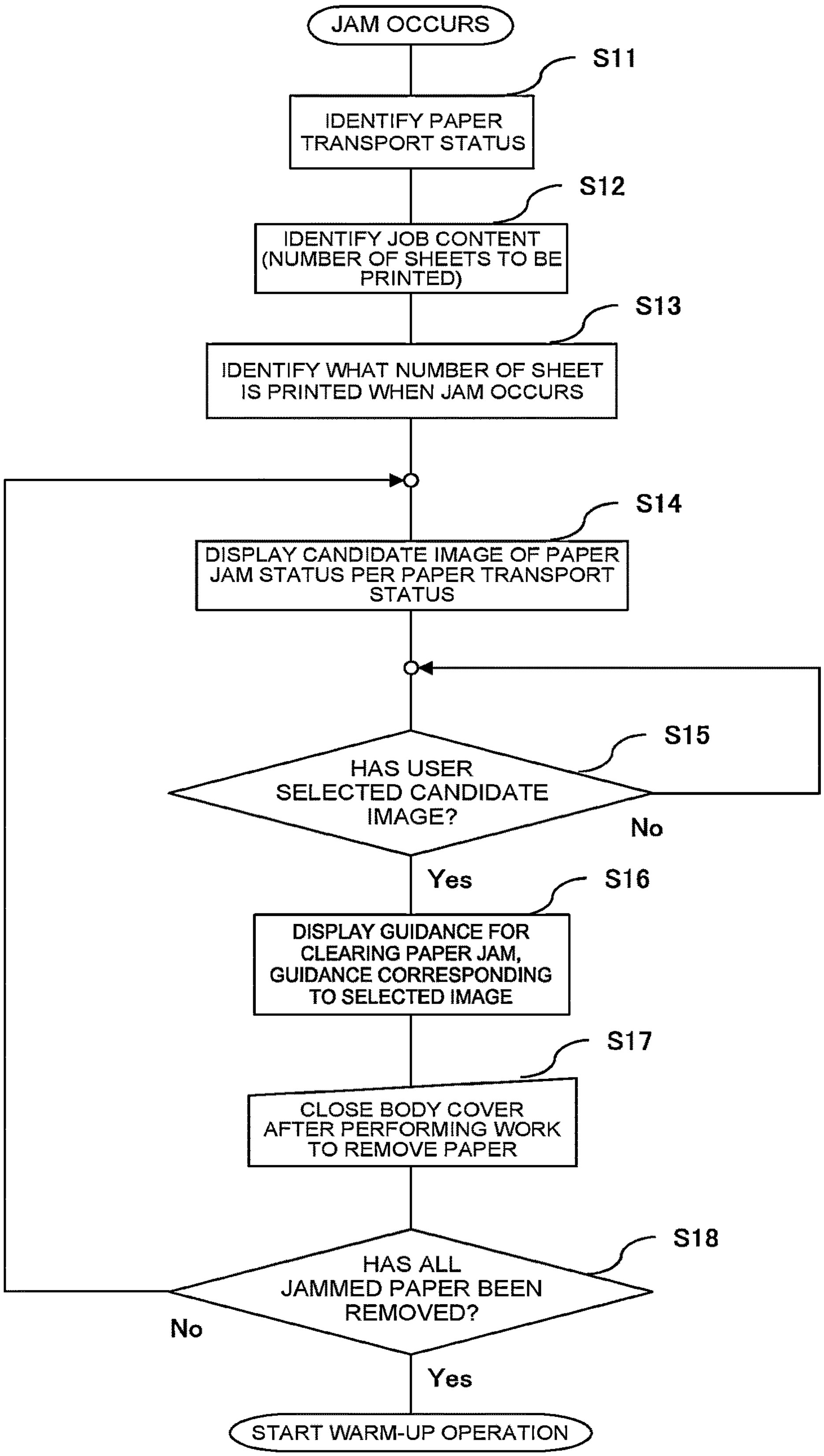
FIG. 7 is a flowchart illustrating an example of guidance display processing for clearing a jam upon occurrence of a paper jam in a digital multifunction peripheral according to a second embodiment of the present disclosure.

FIG. 7 is a flowchart illustrating an example of the guidance display processing for clearing the jam upon the occurrence of the paper jam in the digital multifunction peripheral 1 according to the second embodiment of the present disclosure.

Since processing in steps S11 and S14 to S18 illustrated in FIG. 7 respectively correspond to the processing in steps S1 to S6 illustrated in FIG. 4 (the first embodiment), a description thereon will not be made.

A description will herein be made on processing in steps S12 and S13 in FIG. 7, which is not described in the first embodiment.

In step S11 illustrated in FIG. 7, the transport status of the paper, which is detected by the paper detector 107, is identified (step S11). Thereafter, in step S12, the controller 100 identifies a job content (the number of sheets to be printed) (step S12).

In following step S13, the controller 100 identifies what number of the sheet is printed at the time when the jam occurs, so as to identify jam occurrence timing (Step S13).

In the second embodiment, the paper detection sensors are provided in the same manner as those in the first embodiment, and the controller 100 identifies the paper transport status on the basis of the detection results of the paper detection sensors.

The second embodiment differs from the first embodiment in a point that the controller 100 identifies the assumed paper jam status not only on the basis of the detection result of the paper detector 107 but also with reference to the number of the sheets to be printed and the jam occurrence timing in the job at the time when the jam occurs.

FIG. 8 is a table illustrating exemplary relationships between the paper transport status and the paper jam status, which is assumed when the number of the sheets to be printed in the job is plural, in the digital multifunction peripheral 1 according to the second embodiment of the present disclosure.

Since a case where the number of the sheets to be printed in the job is only one is the same as that in the first embodiment (FIG. 5), a description thereon will not be made.

A description will hereinafter be made on the case where the number of the sheets to be printed in the job is plural.

In the Case Where Paper is Stuck in Fuser 17

In the example illustrated in FIG. 8, in the case where the paper detector 107 detects the paper in the fuser 17, the controller 100 assumes the state where the paper is stuck in the fuser 17, and further identifies the jam occurrence timing.

In the case where the jam occurs in a period from printing of a first sheet to the middle of the job, the controller 100 assumes that the assumed paper jam status is one sheet in the fuser 17 and one sheet in the paper feeder 20.

The assumed paper jam status may appropriately be changed according to a paper transport speed of the digital multifunction peripheral 1.

In the case where the jam occurs during printing of a last sheet, the controller 100 assumes that the assumed paper jam status is one sheet in the fuser 17.

In the Case Where Paper Has Not Reached Fuser 17

In the case where the jam occurs in the period from printing of the first sheet to the middle of the job in the state where the paper has not reached the fuser 17, the controller 100 assumes that the assumed paper jam status is one sheet in the secondary transferer 23 and one sheet in the paper feeder 20.

In the case where the jam occurs during printing of the last sheet, the controller 100 assumes that the assumed paper jam status is one sheet in the secondary transferer 23.

In the Case Where Paper is Stuck in PS Roller 34

In the case where the jam occurs to the first sheet in the state where the paper is stuck in the PS roller 34, the controller 100 assumes that the assumed paper jam status is one sheet in the secondary transferer 23 and one sheet in the paper feeder 20.

In the case where the jam occurs in a period from printing of a second sheet to the middle of the job, the controller 100 assumes that the assumed paper jam status is one sheet in the fuser 17, one sheet in the secondary transferer 23, and one sheet in the paper feeder 20.

In the case where the jam occurs to the last sheet, the controller 100 assumes that the assumed paper jam status is one sheet in the fuser 17 and one sheet in the secondary transferer 23.

In the Case Where Paper Has Not Reached PS Roller 34

In the case where the jam occurs to the first sheet in the state where the paper has not reached the PS roller 34, the controller 100 assumes that the assumed paper jam status is one sheet in the paper feeder 20.

In the case where the jam occurs in a period from the middle of the job to printing of the last sheet, the controller 100 assumes that the assumed paper jam status is one sheet in the fuser 17 and one sheet in the paper feeder 20.

In the Case Where Paper is Stuck in Paper Feed Roller 35

In the case where the jam occurs to the first sheet in the state where the paper is stuck in the paper feed roller 35, the controller 100 assumes that the assumed paper jam status is one sheet in the paper feeder 20.

In the case where the jam occurs in the period from the middle of the job to printing of the last sheet, the controller 100 assumes that the assumed paper jam status is one sheet in the fuser 17 and one sheet in the paper feeder 20.

In the Case Where Paper Has Not Reached Paper Feed Roller 35

In the case where the jam occurs to the first sheet in the state where the paper has not reached the paper feed roller 35, the controller 100 assumes that the assumed paper jam status is one sheet in the paper feeder 20.

In the case where the jam occurs in the period from the middle of the job to printing of the last sheet, the controller 100 assumes that the assumed paper jam status is one sheet in the fuser 17 and one sheet in the paper feeder 20.

Figure 9:
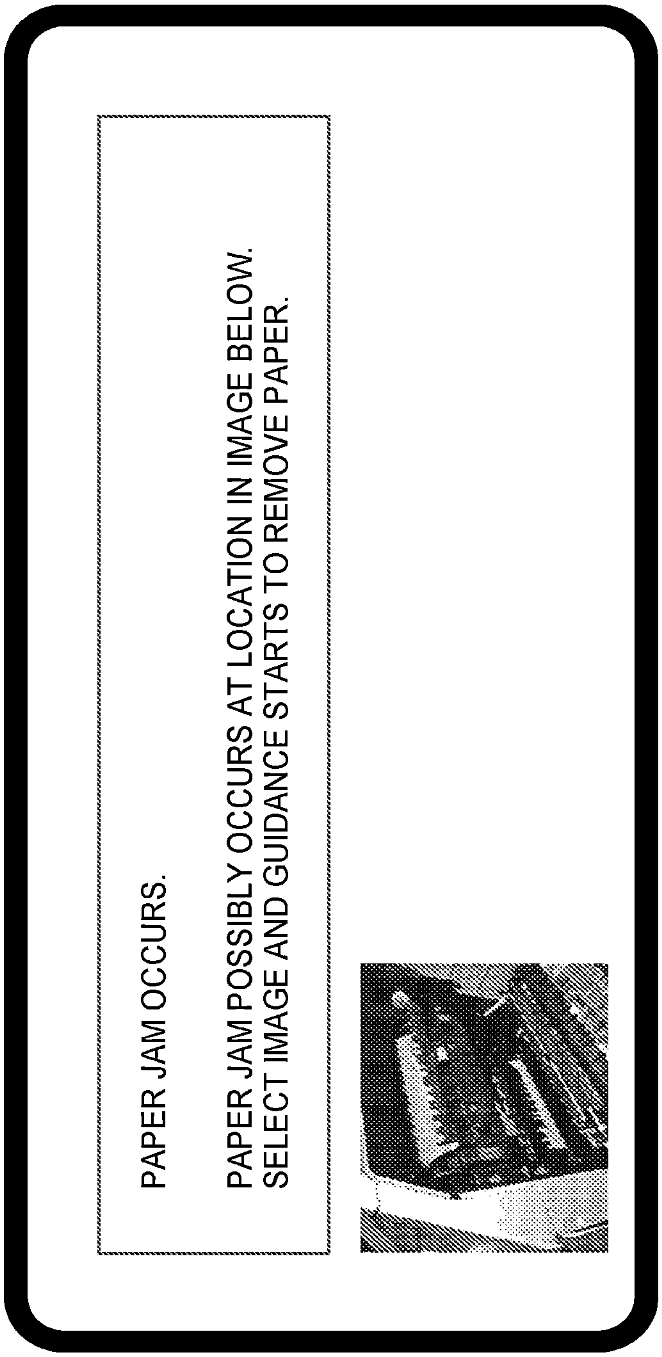
FIG. 9 is an explanatory view illustrating an exemplary message that informs occurrence of the paper jam in the digital multifunction peripheral according to the second embodiment of the present disclosure.

FIG. 9 is an explanatory view illustrating an exemplary message that informs the occurrence of the paper jam in the digital multifunction peripheral 1 illustrated in FIG. 1.

In the case where the assumed paper jam status is one sheet in the fuser 17 and one sheet in the paper feeder 20, as illustrated in FIG. 9, an image showing that the paper jam has occurred in each of the fuser 17 and the paper feeder 20 is displayed with the message "PAPER JAM OCCURS. PAPER JAM POSSIBLY OCCURS AT LOCATION IN IMAGE BELOW. SELECT IMAGE AND GUIDANCE STARTS TO REMOVE PAPER."

In this way, in the case where the paper jam occurs while the paper is transported, the display 1081 displays, in a user-selectable manner, the predetermined image that shows the paper jam status according to the detection result of the paper detector 107 and the jam occurrence timing. Therefore, it is possible to provide the digital multifunction peripheral 1 capable of more efficiently displaying the guidance for clearing the paper jam than the related art.

Third Embodiment

Guidance Display Processing for Clearing Jam upon Occurrence of Paper Jam in Digital Multifunction Peripheral 1 According to Third Embodiment of the Present Disclosure Next, a description will be made on guidance display processing for clearing the jam upon the occurrence of the paper jam in a digital multifunction peripheral 1 according to a third embodiment of the present disclosure with reference to FIG. 10 to FIG. 12.

Since a configuration of the digital multifunction peripheral 1 in the third embodiment is the same as that of the digital multifunction peripheral 1 in the first embodiment (FIG. 1 to FIG. 3), a description thereon will not be made.

Figure 10:
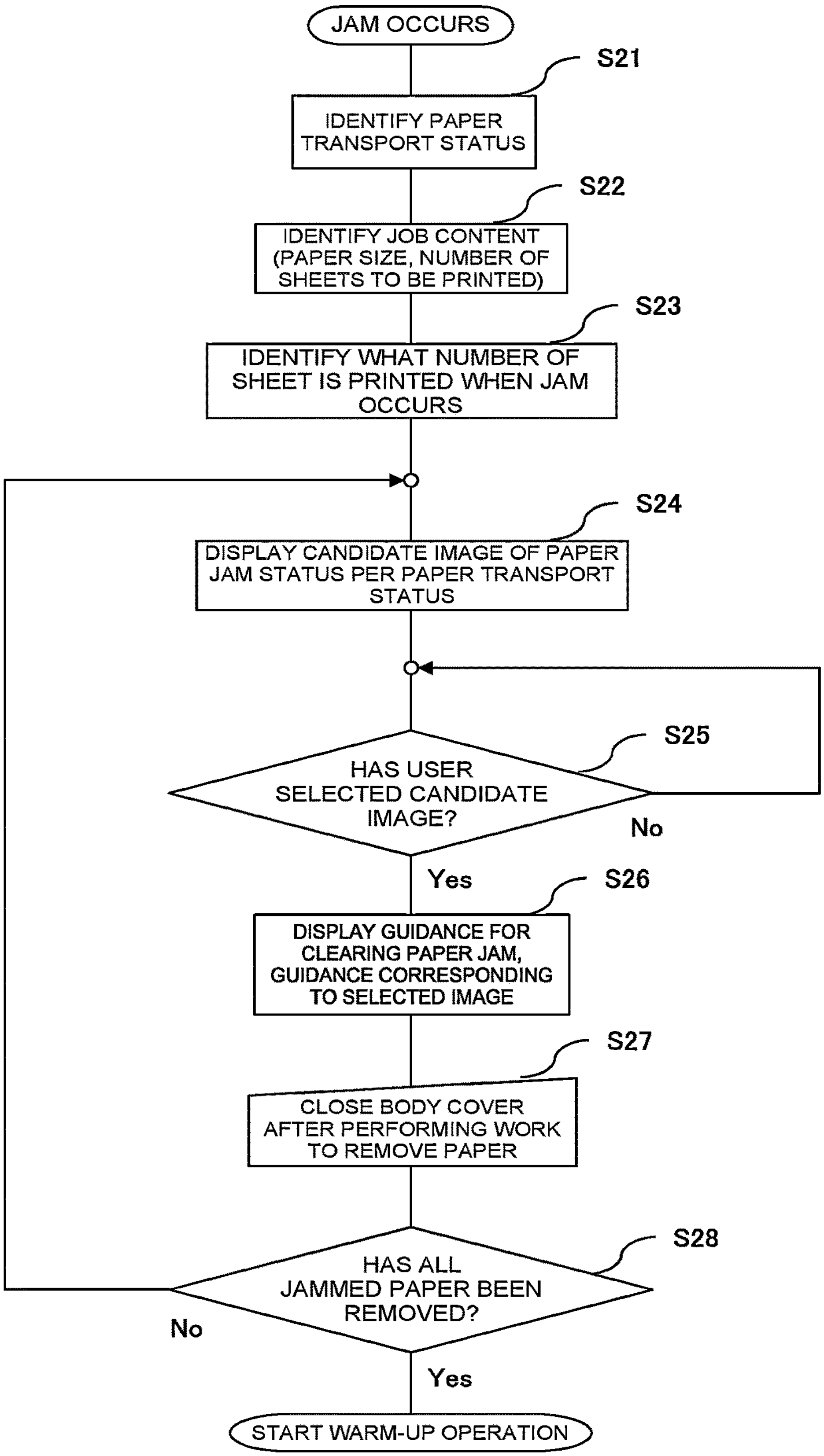
FIG. 10 is a flowchart illustrating an example of guidance display processing for clearing a jam upon occurrence of a paper jam in a digital multifunction peripheral according to a third embodiment of the present disclosure.

FIG. 10 is a flowchart illustrating an example of guidance display processing for clearing the jam upon the occurrence of the paper jam in the digital multifunction peripheral 1 according to the third embodiment of the present disclosure.

Since processing in steps S21 and S23 to S28 illustrated in FIG. 10 respectively correspond to the processing in steps S11 and S13 to S18 illustrated in FIG. 7 (the second embodiment), a description thereon will not be made.

A description will herein be made on processing in step S22, which is illustrated in FIG. 10 and differs from the processing in the second embodiment.

In step S21 illustrated in FIG. 10, the transport status of the paper, which is detected by the paper detector 107, is identified (step S21). Thereafter, in step S22, the controller 100 identifies the job content (a paper size and the number of the sheets to be printed) (step S22).

In the third embodiment, the paper detection sensors are provided in the same manner as those in the first and second embodiments, and the controller 100 identifies the paper transport status on the basis of the detection results of the paper detection sensors.

The third embodiment differs from the first and second embodiments in a point that the controller 100 identifies the assumed paper jam status not only on the basis of the detection result of the paper detector 107 but also with reference to the paper size, the number of the sheets to be printed, and the jam occurrence timing in the job at the time when the jam occurs.

FIG. 11 is a table illustrating exemplary relationships between the paper transport status and the paper jam status, which is assumed when the number of the sheets to be printed in the job is plural and the paper size is each of the small size and the large size, in the digital multifunction peripheral 1 according to the third embodiment of the present disclosure.

Here, the small size means a predetermined paper size, and examples of the small size are A4, B5, and LT. The large size means a predetermined paper size, and examples of the large size are A3, B4, and WLT. LT and WLT are paper names in an inch format, and LT measures: 11×8.5 [inches] while WLT measures: 17×11 [inches].

Since a case where the number of the sheets to be printed in the job is only one is the same as that in the first embodiment (FIG. 5) regardless of the paper size, a description thereon will not be made.

A description will hereinafter be made on the case where the number of the sheets to be printed in the job is plural.

In the Case Where Paper is Stuck in Fuser 17

In the example illustrated in FIG. 10, in the case where the paper detector 107 detects the paper in the fuser 17, the controller 100 assumes the state where the paper is stuck in the fuser 17, and further identifies the jam occurrence timing.

In the case where the jam occurs in the period from printing of the first sheet to the middle of the job, the controller 100 assumes that the assumed paper jam status is one sheet in the fuser 17 and one sheet in the paper feeder 20 when the paper size is the small size, and assumes that the assumed paper jam status is one stuck sheet from the fuser 17 to the secondary transferer 23 when the paper size is the large size.

In the case where the jam occurs during printing of the last sheet, the controller 100 assumes that the assumed paper jam status is one sheet in the fuser 17 regardless of the paper size.

In the Case Where Paper Has Not Reached Fuser 17

In the case where the jam occurs in the period from printing of the first sheet to the middle of the job in the state where the paper has not reached the fuser 17, the controller 100 assumes that the assumed paper jam status is one sheet in the secondary transferer 23 and one sheet in the paper feeder 20 when the paper size is the small size, and assumes that the assumed paper jam status is one stuck sheet from the secondary transferer 23 to the paper feeder 20 when the paper size is the large size (however, depending on a paper feeding source).

Here, "depending on the paper feeding source" means that, when the paper is fed from the top paper feed tray, there is a high possibility that feeding of the next paper is not started, and thus the number of the jammed sheet in this case is one but, when the paper is fed from the bottom paper feed tray, feeding of the next paper may already be started, and thus one more sheet may be left in the paper feeder.

In the case where the jam occurs during printing of the last sheet, the controller 100 assumes that the assumed paper jam status is one sheet in the secondary transferer 23 regardless of the paper size.

In the Case Where Paper is Stuck in PS Roller 34

In the case where the jam occurs to the first sheet in the state where the paper is stuck in the PS roller 34, the controller 100 assumes that the assumed paper jam status is one sheet in the secondary transferer 23 and one sheet in the paper feeder 20 when the paper size is the small size, and assumes that the assumed paper jam status is one stuck sheet from the secondary transferer 23 to the paper feeder 20 when the paper size is the large size (however, depending on the paper feeding source).

In the case where the jam occurs in the period from printing of the second sheet to the middle of the job, the controller 100 assumes that the assumed paper jam status is one sheet in the fuser 17, one sheet in the secondary transferer 23, and one sheet in the paper feeder 20 when the paper size is the small size, and assumes that the assumed paper jam status is one stuck sheet from the secondary transferer 23 to the paper feeder 20 when the paper size is the large size (however, depending on the paper feeding source).

In the case where the jam occurs to the last sheet, the controller 100 assumes that the assumed paper jam status is one sheet in the fuser 17 and one sheet in the secondary transferer 23 when the paper size is the small size, and assumes that the assumed paper jam status is one sheet in the secondary transferer 23 when the paper size is the large size.

In the Case Where Paper Has Not Reached PS Roller 34

In the case where the jam occurs to the first sheet in the state where the paper has not reached the PS roller 34, the controller 100 assumes that the assumed paper jam status is one sheet in the paper feeder 20 regardless of the paper size.

In the case where the jam occurs in the period from the middle of the job to printing of the last sheet, the controller 100 assumes that the assumed paper jam status is one sheet in the fuser 17 and one sheet in the paper feeder 20 regardless of the paper size.

In the Case Where Paper is Stuck in Paper Feed Roller 35

In the case where the jam occurs to the first sheet in the state where the paper has not reached the paper feed roller 35, the controller 100 assumes that the assumed paper jam status is one sheet in the paper feeder 20 regardless of the paper size.

In the case where the jam occurs in the period from the middle of the job to printing of the last sheet, the controller 100 assumes that the assumed paper jam status is one sheet in the fuser 17 and one sheet in the paper feeder 20 regardless of the paper size.

In the Case Where Paper Has Not Reached Paper Feed Roller 35

In the case where the jam occurs to the first sheet in the state where the paper has not reached the paper feed roller 35, the controller 100 assumes that the assumed paper jam status is one sheet in the paper feeder 20 regardless of the paper size.

In the case where the jam occurs in the period from the middle of the job to printing of the last sheet, the controller 100 assumes that the assumed paper jam status is one sheet in the fuser 17 and one sheet in the paper feeder 20 regardless of the paper size.

Figure 12:
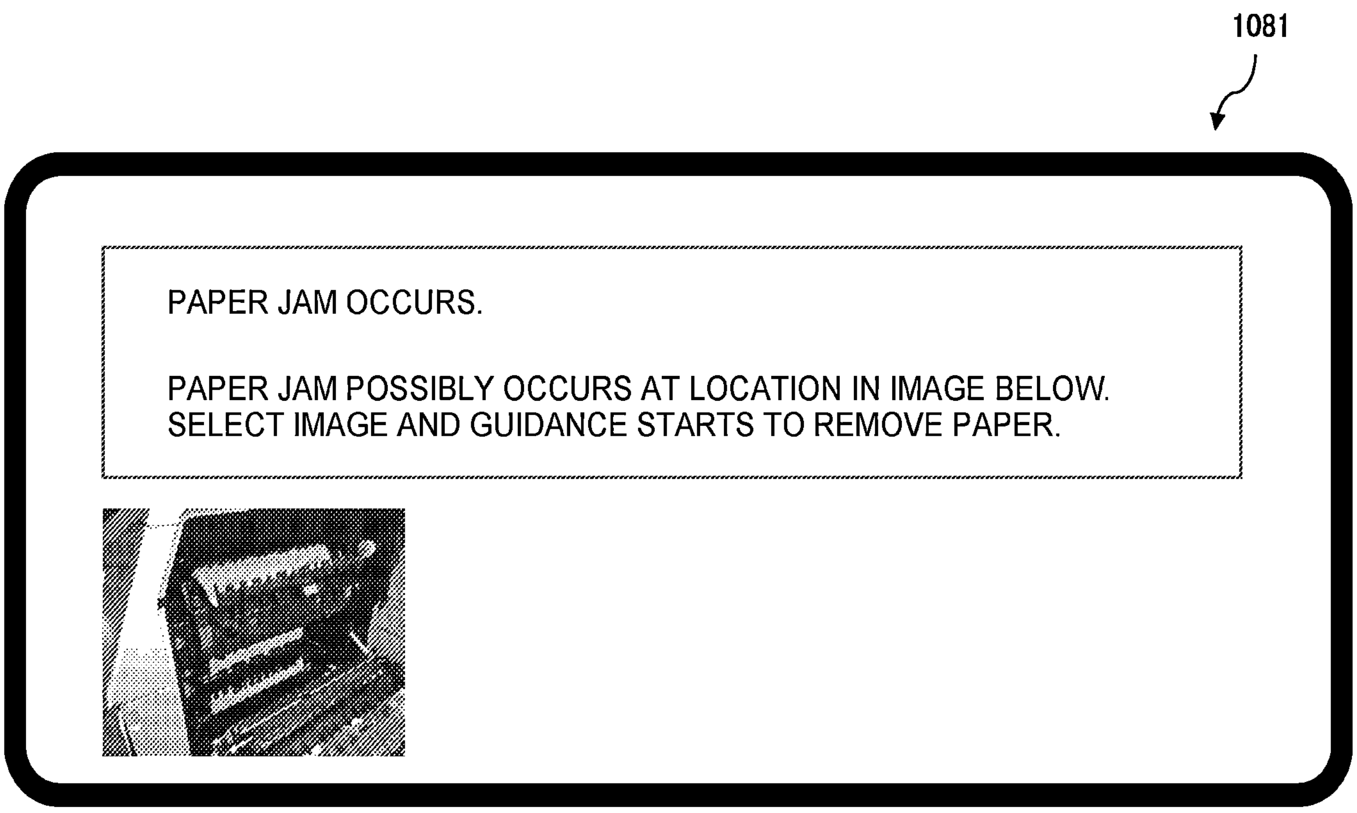
FIG. 12 is an explanatory view illustrating an exemplary message that informs occurrence of the paper jam in the digital multifunction peripheral according to the third embodiment of the present disclosure.

FIG. 12 is an explanatory view illustrating an exemplary message that informs the occurrence of the paper jam in the digital multifunction peripheral 1 according to the third embodiment of the present disclosure.

In the case where the paper size is the large size and the assumed paper jam status is one sheet in the fuser 17 and one sheet in the secondary transferer 23, as illustrated in FIG. 12, an image showing that the paper jam has occurred from the fuser 17 to the secondary transferer 23 is displayed with the message "PAPER JAM OCCURS. PAPER JAM POSSIBLY OCCURS AT LOCATION IN IMAGE BELOW. SELECT IMAGE AND GUIDANCE STARTS TO REMOVE PAPER."

In this way, in the case where the paper jam occurs while the paper is transported, the display 1081 displays, in a user-selectable manner, the predetermined image that shows the paper jam status according to the detection result of the paper detector 107 and the paper size. Therefore, it is possible to provide the digital multifunction peripheral 1 capable of more efficiently displaying the guidance for clearing the paper jam than the related art.

Fourth Embodiment

Guidance Display Processing for Clearing Jam upon Occurrence of Paper Jam in Digital Multifunction Peripheral 1 According to Fourth Embodiment of the Present Disclosure Next, a description will be made on guidance display processing for clearing the jam upon the occurrence of the paper jam in a digital multifunction peripheral 1 according to a fourth embodiment of the present disclosure with reference to FIG. 13 to FIG. 15.

Since a configuration of the digital multifunction peripheral 1 in the fourth embodiment is the same as that of the digital multifunction peripheral 1 in the first embodiment (FIG. 1 to FIG. 3), a description thereon will not be made.

Figure 13:
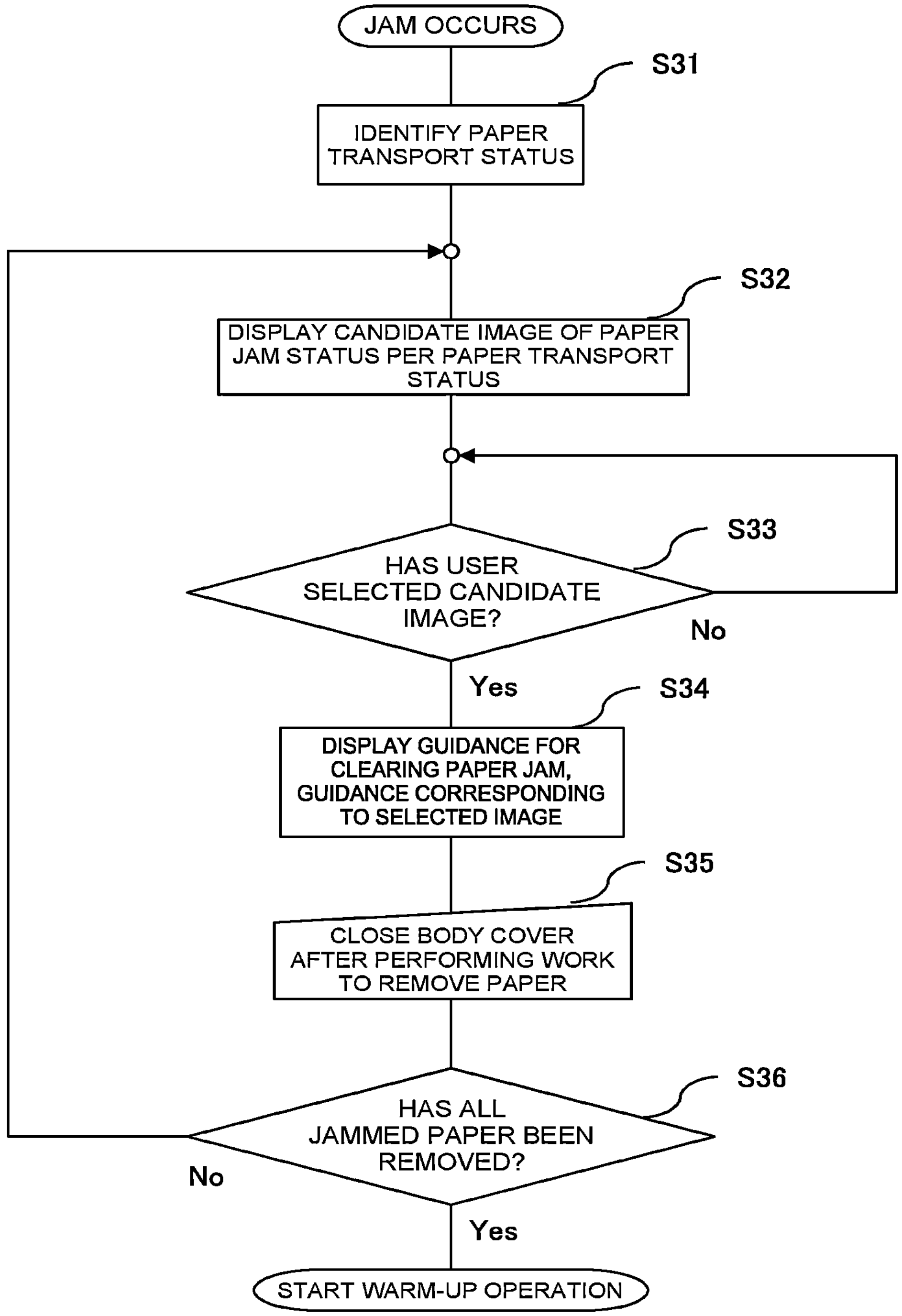
FIG. 13 is a flowchart illustrating an example of guidance display processing for clearing a jam upon occurrence of a paper jam in a digital multifunction peripheral according to a fourth embodiment of the present disclosure.

FIG. 13 is a flowchart illustrating an example of the guidance display processing for clearing the jam upon the occurrence of the paper jam in the digital multifunction peripheral 1 according to the fourth embodiment of the present disclosure.

Since processing in steps S31 to S36 illustrated in FIG. 13 respectively correspond to the processing in steps S1 to S6 illustrated in FIG. 4 (the first embodiment), a description thereon will not be made.

In the fourth embodiment, the paper detection sensors are provided in the same manner as those in the first embodiment, and the controller 100 identifies the paper transport status on the basis of detection results of the paper detection sensors.

The fourth embodiment differs from the first embodiment in a point that the controller 100 does not refer to the job content at the time when the jam occurs and displays all the candidate images of the assumed paper jam status to be selected by the user. The paper jam status is assumed when the paper size is each of the small size and the large size and the number of the sheets to be printed in the job is each of one and plural.

FIG. 14 is a table illustrating exemplary relationships between the paper transport status and the paper jam status, which is assumed when the number of the sheets to be printed in the job is plural and the paper size is each of the small size and the large size, in the digital multifunction peripheral 1 according to the fourth embodiment of the present disclosure.

In the table illustrated in FIG. 14, the table (in the case where the number of the sheets to be printed in the job is only one) in FIG. 5 (the first embodiment), the table (in the case where the number of the sheets to be printed in the job is plural) in FIG. 8 (the second embodiment), and the table (in the case where the number of the sheets to be printed in the job is plural and the paper size includes the small size and the large size) in FIG. 11 (the third embodiment) are all integrated.

Figure 15:
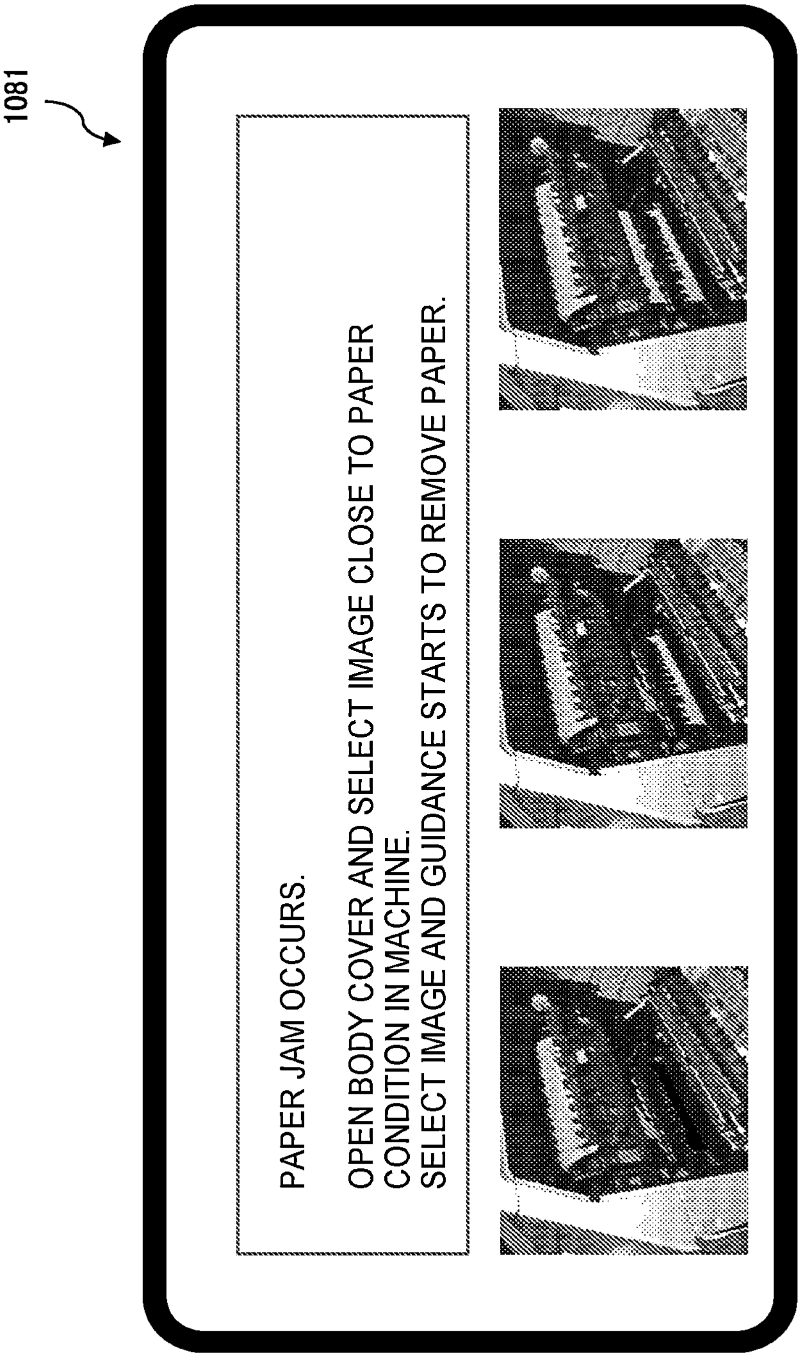
FIG. 15 is an explanatory view illustrating an exemplary message that informs occurrence of the paper jam in the digital multifunction peripheral according to the fourth embodiment of the present disclosure.

FIG. 15 is an explanatory view illustrating an exemplary message that informs the occurrence of the paper jam in the digital multifunction peripheral 1 according to the fourth embodiment of the present disclosure.

In the case where the paper transport status is the status where the paper is stuck in the fuser 17, the various assumed paper jam statuses are considered with reference to the table in FIG. 14 according to the number of the sheets to be printed in the job (plural or only one), the jam occurrence timing (the first sheet to the middle of the job, the last sheet, or the first sheet), and the paper size (the small size or the large size).

In this case, as illustrated in FIG. 15, three types of the candidate images, each of which shows that the paper jam has occurred, are displayed with the message "PAPER JAM OCCURS. OPEN BODY COVER AND SELECT IMAGE CLOSE TO PAPER CONDITION IN MACHINE. ONCE SELECT IMAGE, START GUIDANCE TO REMOVE PAPER."

Then, the user opens the body cover and selects one of the three types of the candidate images that is close to the actual paper condition in the peripheral.

In this way, in the case where the paper jam occurs while the paper is transported, the display 1081 displays, in a user-selectable manner, the images, each of which shows the assumed paper jam status, according to the detection result of the paper detector 107, the number of the sheets to be printed in the job, the jam occurrence timing, and the paper size. Therefore, it is possible to provide the digital multifunction peripheral 1 capable of more efficiently displaying the guidance for clearing the paper jam than the related art.

The preferred modes of the present disclosure also include combinations of any of the above-described modes.

Various modifications of the present disclosure may be implemented in addition to the above-described embodiments. Those modifications should not be construed as falling outside the scope of the present disclosure. The present disclosure is embodied by the claims and their equivalents, and should embrace all modifications within the scope of the claims.

What is claimed is:

1. An image forming apparatus comprising:
- an operation acceptor that accepts an input operation performed by a user;
- a transporter that transports a paper along a transport path;
- an image former that forms an image on the paper based on image data when accepting a print command of the image data from the user;
- a paper detector that detects a transport status of the paper based on detection results of paper detection sensors that are provided at various locations on the transport path;
- a display that displays various types of information to the user;
- a storage that stores a plurality of predetermined images showing an assumed jam status of the paper and predetermined guidance for clearing the assumed jam status of the paper when a jam, in which the paper is jammed, occurs while the paper is transported; and
- a controller that controls the operation acceptor, the transporter, the image former, the paper detector, the display, and the storage, wherein
- in a case that the jam occurs while the paper is transported, the controller causes the display to display, in a user-selectable manner, a plurality of candidate images, among the plurality of predetermined images, showing a paper jam status based on a detection result of the paper detector, each of the plurality of candidate images showing a different paper jam status, and
- in a case that the operation acceptor accepts a selection of at least one candidate image, among the plurality of candidate images, the controller causes the display to display the predetermined guidance for clearing the paper jam status, the predetermined guidance corresponding to the selected at least one candidate image.

2. The image forming apparatus according to claim 1, wherein
- the at least one candidate image showing the paper jam status is an image showing one of various patterns of status where the paper is jammed at respective locations on the transport path when a predetermined cover of a body is opened.

3. The image forming apparatus according to claim 1, wherein in a case that the controller accepts the print command of the image data from the user and thereafter the jam occurs while the paper is transported, the controller determines whether a number of images to be printed, which is based on the image data, is plural,
- when the number of the images to be printed is plural, the controller identifies a number of the images that is printed at the time when the jam occurs, so as to identify an occurrence timing of the jam, and
- the controller causes the display to display, in the user-selectable manner, the at least one candidate image, among the plurality of candidate images, based on the detection result of the paper detector and the occurrence timing of the jam.

4. The image forming apparatus according to claim 1, wherein in a case that the controller accepts the print command of the image data from the user and thereafter the jam occurs while the paper is transported, the controller identifies a paper size of the image based on the image data, and the controller causes the display to display, in the user-selectable manner, the at least one candidate image, among the plurality of candidate images, based on the detection result of the paper detector and the paper size.

5. The image forming apparatus according to claim 4, wherein the paper size includes a first paper size and a second paper size that is larger than the first paper size, the first paper size includes paper sizes of A4 and B5, and the second paper size includes paper sizes of A3 and B4.

* * * * *